United States Patent
Ruvalcaba et al.

(10) Patent No.: US 9,060,330 B2
(45) Date of Patent: Jun. 16, 2015

(54) SYSTEM SELECTION AND DETERMINATION THROUGH A SMART STORAGE DEVICE

(75) Inventors: Jose Alfredo Ruvalcaba, Winchester, CA (US); Damir Didjusto, San Diego, CA (US); Shriram Ganesh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 13/527,534

(22) Filed: Jun. 19, 2012

(65) Prior Publication Data

US 2013/0336374 A1  Dec. 19, 2013

(51) Int. Cl.
*H04L 5/16* (2006.01)
*H04W 48/18* (2009.01)
*H04W 8/18* (2009.01)

(52) U.S. Cl.
CPC .............. *H04W 48/18* (2013.01); *H04W 8/183* (2013.01)

(58) Field of Classification Search
CPC ..... H04W 12/08; H04W 12/12; H04W 48/16; H04W 48/18; H04W 4/003; H04W 60/00; H04W 64/00; H04W 72/005; H04W 88/02; H04W 88/06; H04W 8/005; H04W 8/245; H04W 8/183; H04M 15/8011; H04M 17/103; H04M 2215/7213
USPC .......................................... 375/222, 295, 316
See application file for complete search history.

(56) References Cited

U.S. PATENT DOCUMENTS

| | | | |
|---|---|---|---|
| 7,198,199 B2 | 4/2007 | Ho | |
| 8,483,261 B2* | 7/2013 | Seo et al. | 375/222 |
| 8,503,376 B2* | 8/2013 | Cha et al. | 370/329 |
| 8,527,006 B2* | 9/2013 | Tat et al. | 455/558 |
| 8,625,506 B2* | 1/2014 | Chin | 370/329 |
| 2005/0148333 A1 | 7/2005 | Buckley | |
| 2010/0062808 A1 | 3/2010 | Cha et al. | |
| 2010/0099393 A1 | 4/2010 | Brisebois et al. | |
| 2011/0158090 A1 | 6/2011 | Riley et al. | |
| 2011/0300865 A1 | 12/2011 | Kashikar et al. | |
| 2012/0129513 A1 | 5/2012 | Van Der Laak | |

OTHER PUBLICATIONS

International Search Report and Written Opinion—PCT/US2013/045701—ISA/EPO—Sep. 30, 2013.
Khlifi, et al., "IMS for Enterprises," IEEE Communications Magazine, Jul. 2007, pp. 68-75.

* cited by examiner

*Primary Examiner* — Dhaval Patel
(74) *Attorney, Agent, or Firm* — Abdollah Katbab

(57) ABSTRACT

A method, an apparatus, and a computer program product for wireless communication are provided in which system selection and system determination algorithms maintained in a smart storage device are used by a modem of a mobile wireless terminal. The smart storage device may provide configuration data and algorithms to be used by the modem and functions ordinarily performed by the modem may be performed by a processor of the smart storage device. The functions may include system determination, system configuration and system selection functions. The smart storage device may receive network information from the modem for use in performing the functions. The smart storage device permits preferences and policies set by a home network operator to override preferences and policies set by an operator of a network to which the wireless terminal is currently connected.

59 Claims, 11 Drawing Sheets

SYSTEM SELECTION AND DETERMINATION THROUGH A SMART STORAGE DEVICE

BACKGROUND

1. Field

The present disclosure relates generally to communication systems, and more particularly, to determination and selection of radio access networks.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Systems, methods and apparatus are described for applying system selection and system determination algorithms maintained in a smart storage device such as a Universal Integrated Circuit Card (UICC). The smart storage device may provide configuration data and algorithms to be used by a modem and may perform one or more functions such as system determination, system configuration and system selection on behalf of the modem. Methods, systems and apparatus are disclosed in which system selection and system determination algorithms maintained in a smart storage device are used by a modem of a mobile wireless terminal. The smart storage device may provide configuration data and/or algorithms to be used by the modem and functions ordinarily performed by the modem may be performed by a processor of the smart storage device. The functions may include system determination, system configuration and system selection functions. The smart storage device may receive network information from the modem for use in performing the functions. The smart storage device may be configured to override preferences and policies set by an operator of a network to which the wireless terminal is currently connected.

In an aspect of the disclosure, network information is received from a modem of a user equipment (UE), the network information including at least one radio frequency (RF) measurement.

In an aspect of the disclosure, a function of a modem is controlled using a processor of a non-volatile storage device communicatively coupled to the UE. The function of the modem may be controlled based on the network information and in accordance with preferences of a network operator.

In an aspect of the disclosure, the function of the modem is performed during a search for a network. The function of the modem may be controlled by causing the modem to select a radio access network from a plurality of available networks. The function of the modem may be controlled by causing the modem to select a network identified by an algorithm executed by the processor of the storage device. The algorithm provided on the storage device may be provided or configured by the network operator.

In an aspect of the disclosure, network selection is made for circuit-switched fallback.

In an aspect of the disclosure, the storage device maintains an identifier unique to the UE. The identifier may be used to identify the UE during signal acquisition within the network. The storage device may comprise a UICC.

In an aspect of the disclosure, the function of the modem is controlled by executing a system determination algorithm on the storage device, and causing the modem to acquire a signal of a network identified by the system determination algorithm. The system determination algorithm may identify the network based on the preferences of the network operator. The system determination algorithm may be executed on the storage device and execution by the modem of another system determination algorithm may be prevented.

In an aspect of the disclosure, an operational aspect of the modem is configured in accordance with the preferences of the network operator. The operational aspect of the modem may be configured by modifying a system determination algorithm of the modem. The operational aspect of the modem may be configured by executing an application on the storage device that modifies an RF behavior of the modem.

In an aspect of the disclosure, an update from the network operator is received through a wireless network. The update may include a reconfiguration of the application.

DETAILED DESCRIPTION

Figure 1:
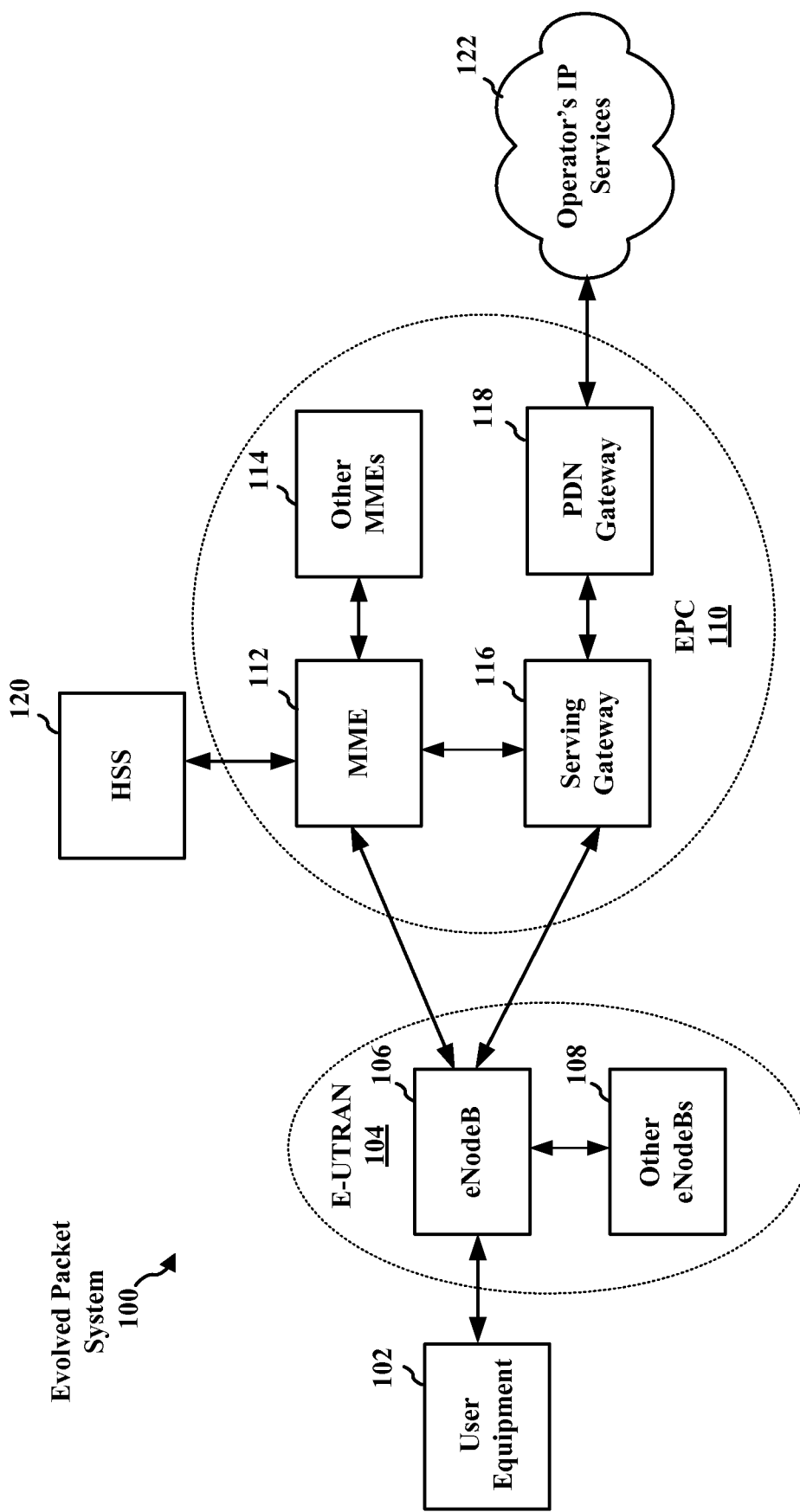
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
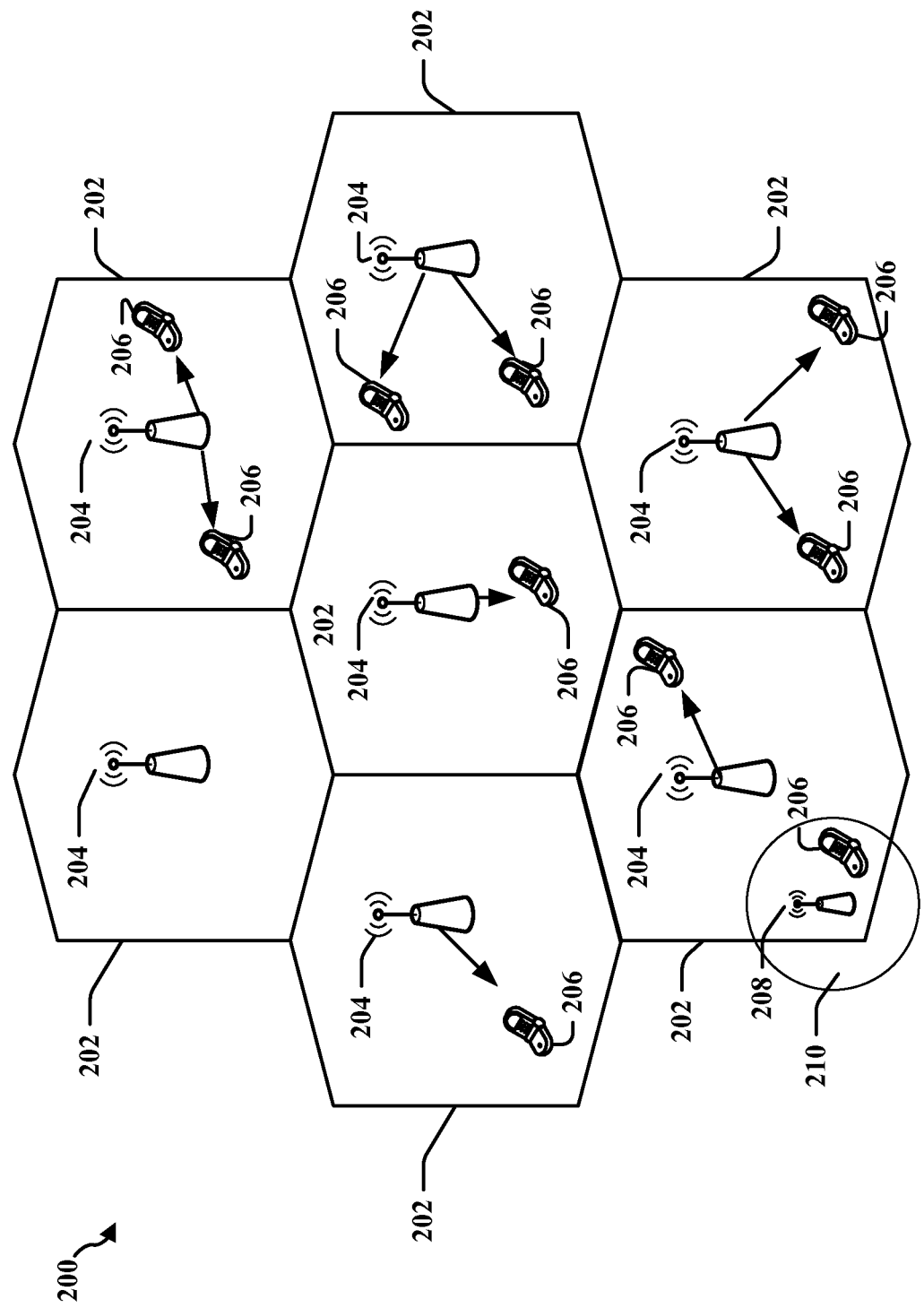
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
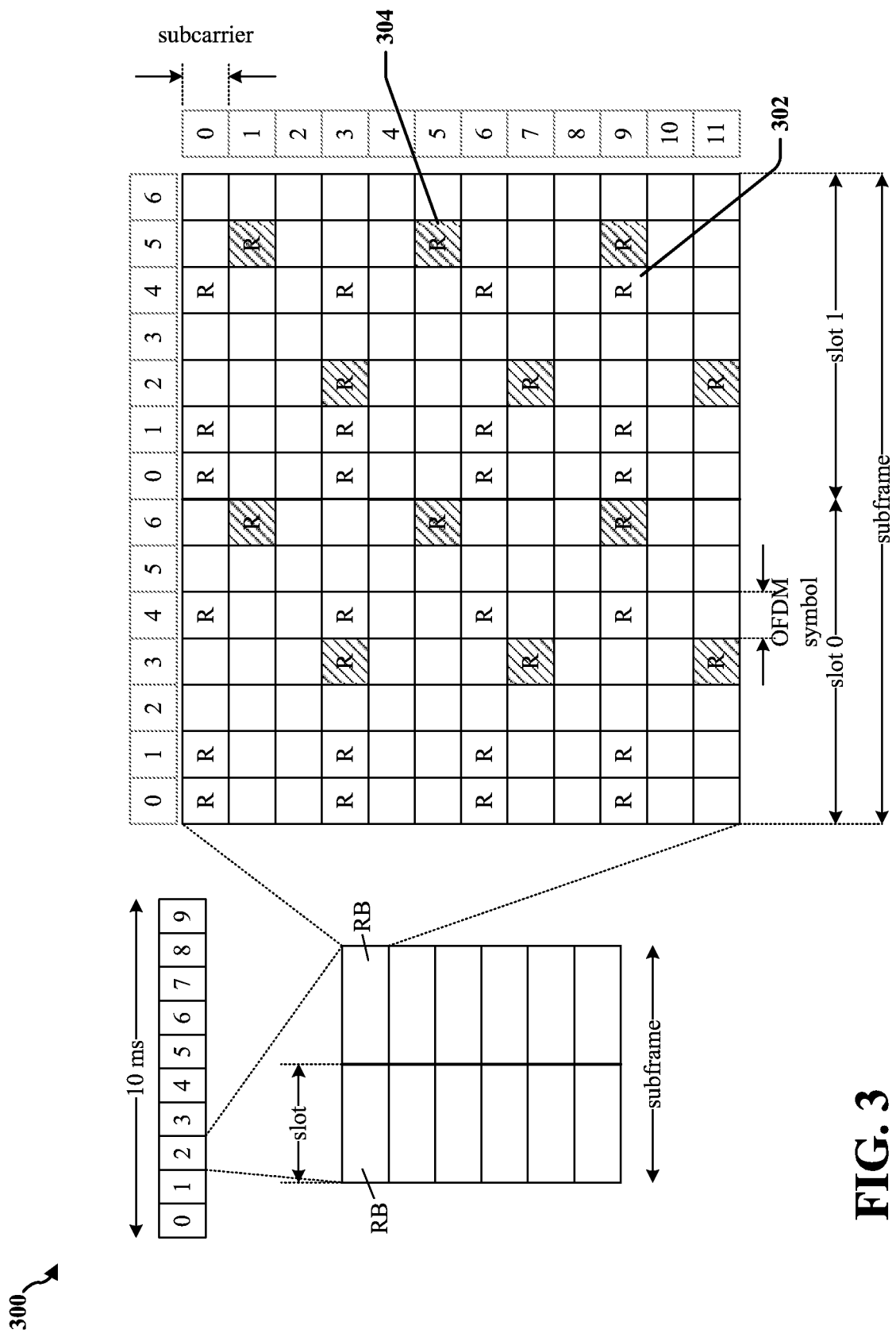
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
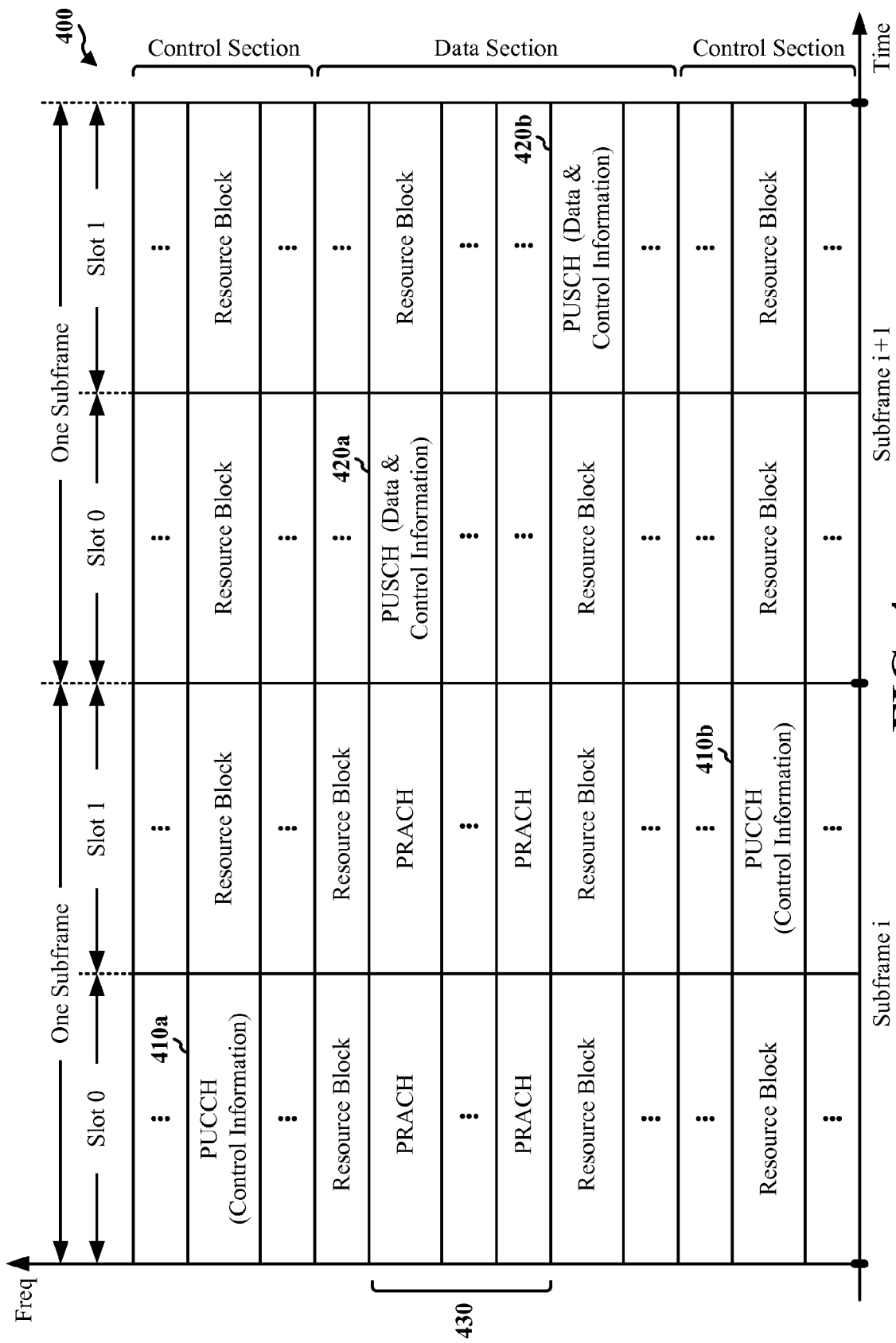
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
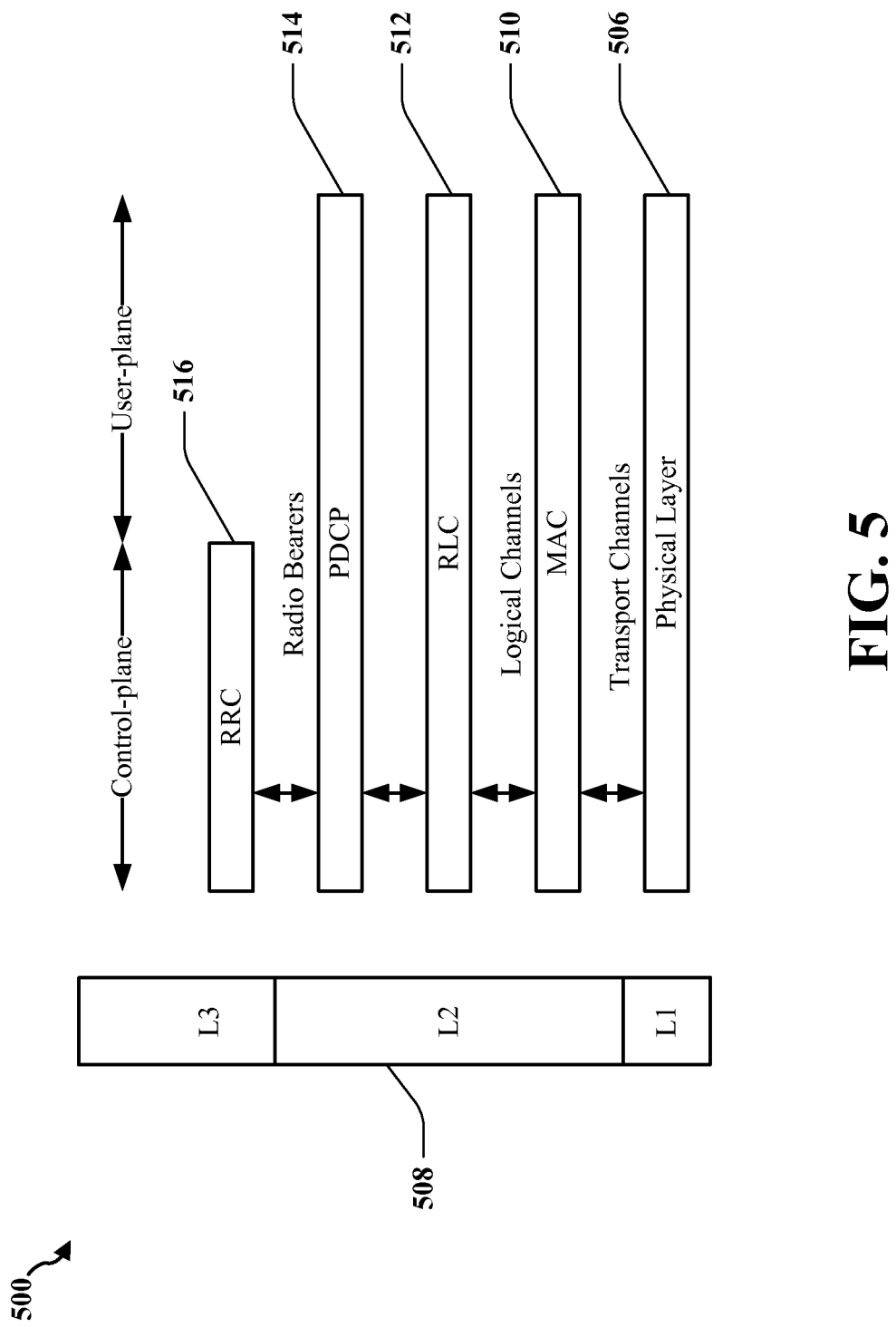
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
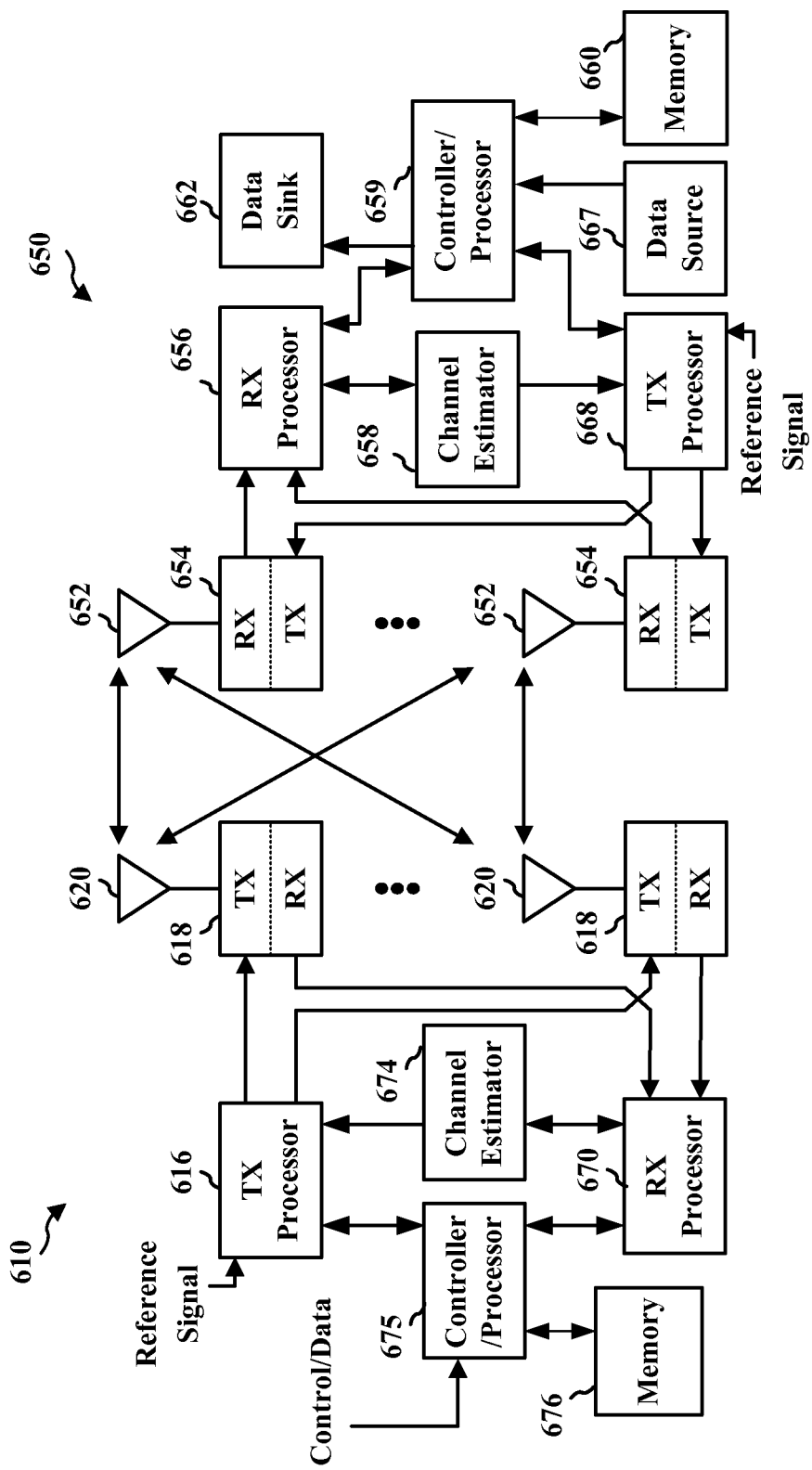
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

A UE may be configured by network operators through signaling and information provided on the UE. A network operator may set policies and preferences to be observed by the UE while connected to a radio access network (RAN). These and policies and procedures may be communicated in signaling received by the UE during network acquisition and may determine, for example, priorities for network acquisition and reselection. In one example, the network operator may define a preferred radio access technology (RAT) to be used for voice service. An operator of the home network of the UE may also preconfigure certain operational characteristics of the UE. A network operator may configure non-volatile storage of a UE and/or provide configuration information on a removable device, such as a smart card. For example, a GSM or UMTS network operator may include configuration information on a UICC or other smart card used in mobile terminals. One or more applications may be provided on the UICC, including one or more of a subscriber identity module (SIM) application, a UMTS SIM application, an IMS identity module (ISIM), a phone book application, and other user applications. The smart card typically includes a unique identifier used to identify the UE during signal acquisition within a RAN.

In certain embodiments of the invention, an operator network may provide configuration information and UE configuration applications in a UICC provided to a subscriber by the operator of the home network of the subscriber or by a service provider associated with the home network of the subscriber. The configuration information and configuration applications may be used to reconfigure a modem of a UE used by the subscriber in order to set preferences and/or polices for system determination or system selection. The policies and preferences are defined by the home network operator and one or more configuration applications may be used to allow the home network operator policies to supersede one or more policies and preferences of a different network operator when the UE is roaming.

Figure 7:
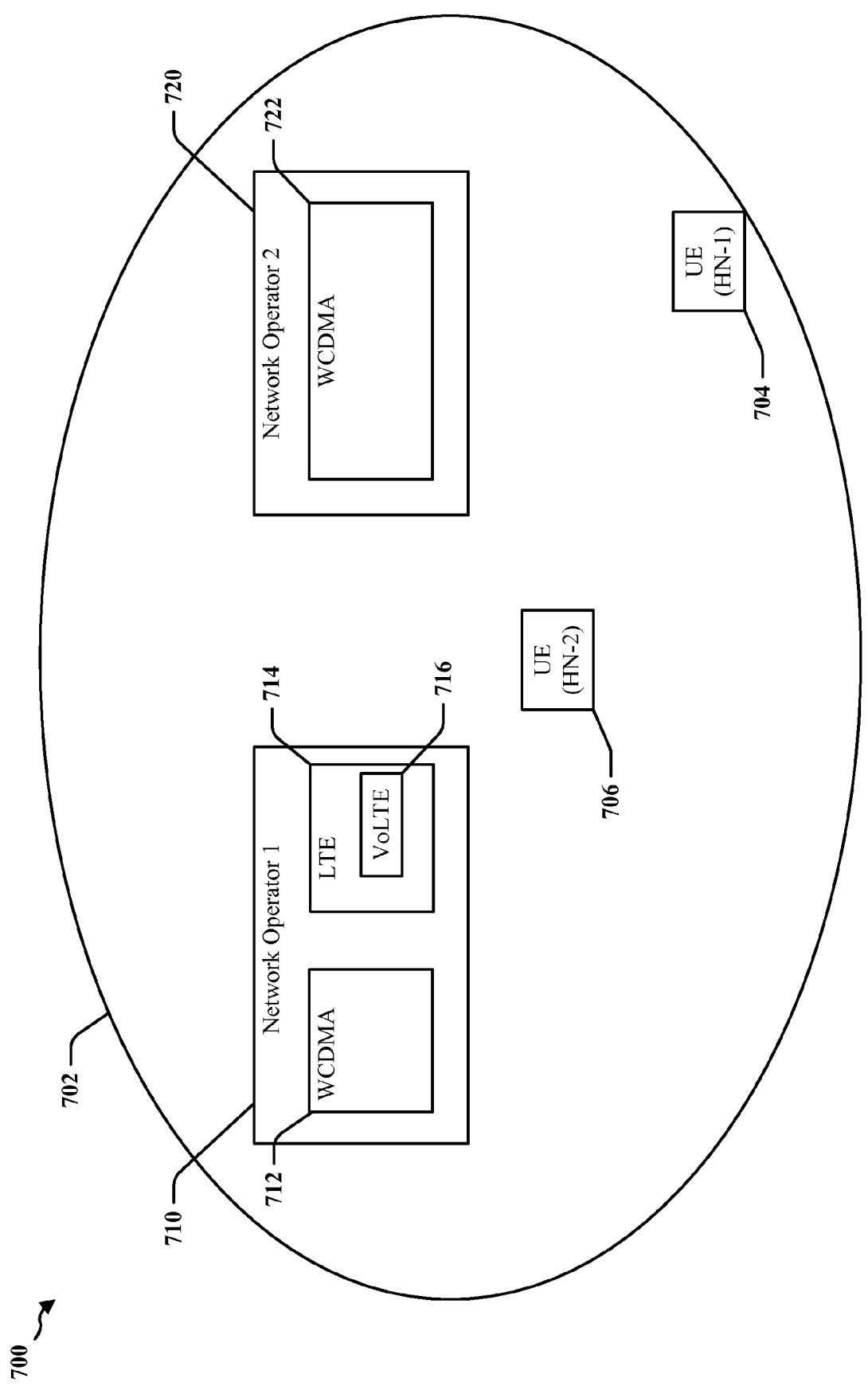
FIG. 7 is a diagram illustrating a wireless network served by multiple network operators.

FIG. 7 is a diagram 700 that illustrates a networking environment in which network operators 710 and 720 provide network services within a common geographic area 702. In the example, a first network operator 710 supports a plurality of RATs, including WCDMA in RAN 712 and LTE in RAN 714, and services including voice over LTE (VoLTE) 716. In the example, a second network operator 720 provides more limited services including a WCDMA RAT 722. FIG. 7 may be representative of an example where second network operator 720 has not deployed LTE (or other RAT). In the example of FIG. 7, a first UE 704 is used by subscriber of first network operator 710, while a second UE 706 is used by a subscriber of second network operator 720.

Second UE 706 may connect to the LTE RAN 714 operated by network operator 710 to use data services because LTE service is not provided by its home network operator 720. First network operator 710 may configure second UE 706 to use VoLTE 716 or WCDMA RAN 722 of first network operator 710. However, home network operator 720 may prefer that UE 706 connect to WCDMA RAN 722 for voice calls rather than use VoLTE 716, or to WCDMA RAN 712 provided by first network operator 710. Under another scenario, UE 704 may be in motion and roaming in RAN 722 to make a voice call. Upon termination of the call, the preference of home network operator 710 of UE 704 that UE 704 camp on either WCDMA RAN 712 or LTE RAN 714 may be overridden by preferences set by second network operator 720 when UE 704 established the connection in RAN 722.

Certain embodiments enable network operators 710 and 720 to control the behavior of UEs 704 and 706 respectively when UEs 704 and 706 are roaming in another network. In effect, dynamically signaled preferences, priorities and configurations can be superseded by preferences set by home network operators 710 and 720 and operational behaviors and characteristics may be modified using applications and configuration information provided to UE 704, 706 by a network operator 710, 720 or other service provider.

Certain embodiments enable network operators 710 and 720 to customize preferences and priorities for UEs 704 and 706 respectively based on the capabilities of the UEs 704 and 706. One or more UEs (including UEs 704 and 706) may comprise a device that does not use voice services, that does not use data services or that uses both voice and data services. In some embodiments, a network operator 710 or 720 may change network search priorities and camping policies based on the specific capabilities of a UE 704 or 706. Thus, UE 704 or 706 may be adapted to use data services only and a UICC may be configured to cause the data-only UE 704 or 706 to camp in a packet data network, even if the policy of the current network provider directs the UE 704 or 706 to camp in a circuit-switched network.

Figure 8:
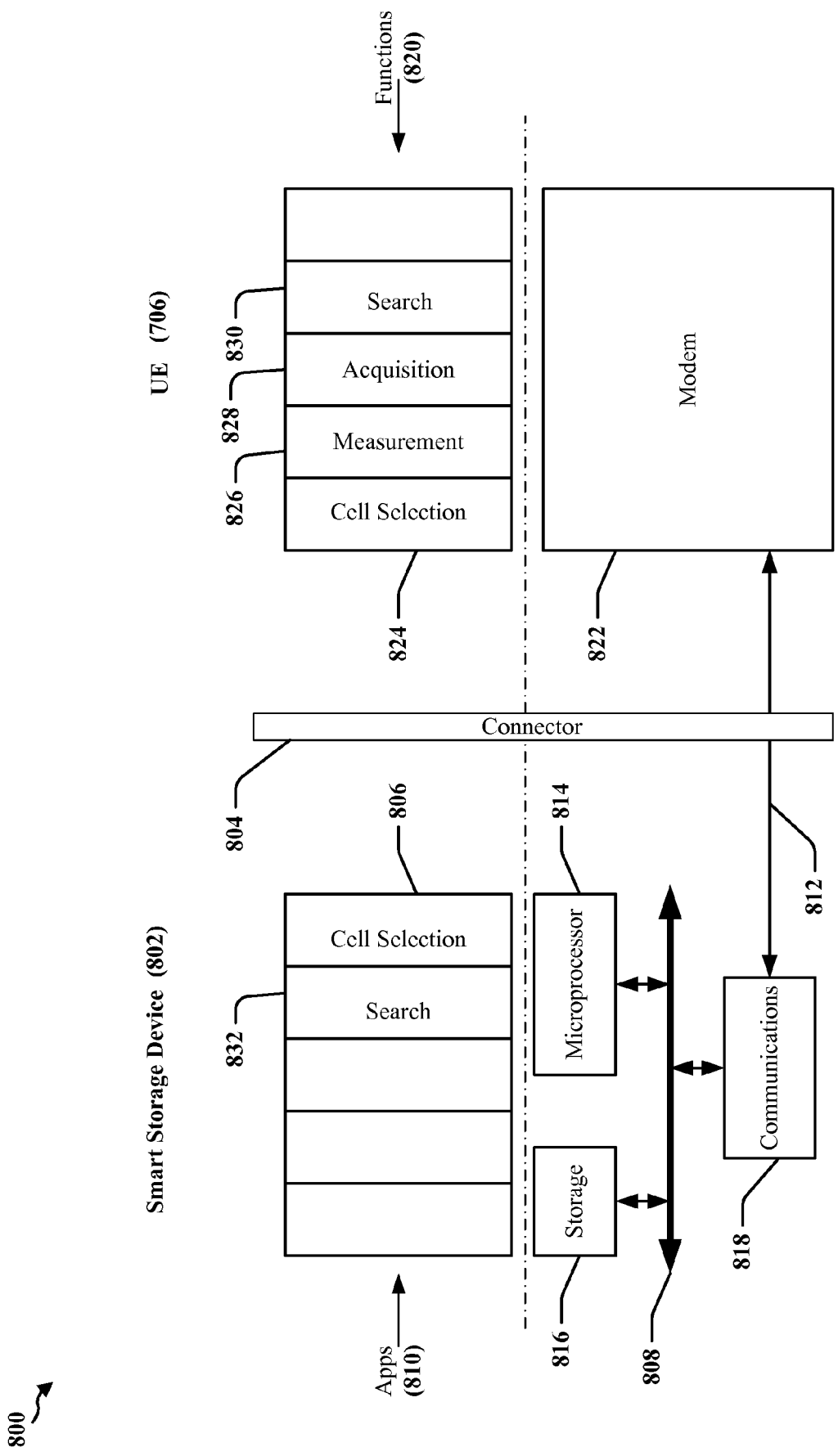
FIG. 8 is a diagram illustrating a smart storage device according to certain aspects of the invention.

FIG. 8 is a simplified block schematic 800 illustrating an embodiment in which a SIM, USIM, UICC, or other smart storage device 802 is used to configure a UE 706 based on preferences of home network operator 720 and/or based on the capabilities of the UE 706. In some embodiments, the smart storage device 802 may configure an operational aspect of the UE 706 in a manner that does not conform with a policy or preference a network operator 710 that provides a current connection for the UE 706. Smart storage device 802 may comprise a microprocessor, microcontroller, or other processing device 814 that accesses data and instructions in storage 816 through bus 808. Processor 814 may communicate with modem 822 of UE 706 using communications device 818 which may establish a serial or other connection 812 with UE 706, or a component thereof. Smart storage device 802 may be physically connected to UE 706 through a connector 804.

One or more applications 810 may be executed or be executable by smart storage device 802. Processor 814 may be controlled by an operating system or scheduler that manages applications 810, although some applications may be initiated based on a request or other event including, for example, a request transmitted by modem 822. Modem 822 may comprise a processing system and/or logic that performs one or more functions 820, such as cell measurement 826, cell acquisition 828 and cell selection. Smart storage device 802 may execute one or more applications 810 that configure a function 820 to conform with policies and preferences of a home network operator 720. Smart storage device 802 may configure or replace an algorithm used by modem 822.

In some embodiments, one of the applications 810 may supplant or supplement one of the functions 820 performed by modem 822. In one example, modem 822 may determine that the cell selection function 824 is to be performed by an application 806 executed on the smart storage device 802. Such determination may be made as a result of a message sent by smart storage device 802. In some embodiments, modem 822 may be configured to query smart storage device 802 to determine which applications are available for execution on the smart storage device 802. If the modem 822 determines that a cell selection application 806 is active or available on smart storage device 802, then the modem 822 may initialize application 806 or otherwise indicate that the application 806 should be executed on the smart storage device 802.

The modem 822 may send information necessary for cell selection to the smart storage device 802. The information may include network measurements such as radio frequency (RF) signal strength measurements, current cell selection priorities and preferences, identification of providers 710 or 720 of networks detected by the modem, identification of networks available to the modem, type or types of service to be acquired by the modem, information related to UE 706 status and current network connections, and so on. Upon receiving network information from the modem 822, one or more applications 806 on the smart storage device 802 may be executed by processor 814 to determine which of the available networks is to be selected by the modem 822. The determination may include a consideration of preferences and priorities of the home network operator 720. The determination may be made using an algorithm or selection scheme provided or selected by the home network operator 720. The smart storage device 802 may then provide information to modem 822 that identifies the network to be acquired.

In some embodiments, the smart storage device 802 may execute an application 832 that controls a function 828 of the modem 822 related to a search for a network. In one example, application 832 may reassign priorities for the search and, in another example, the application 832 may perform the search. Accordingly, the applications and other data on a smart storage device 802 may control functions of the modem 822 and affect how the modem selects a radio access network (RAN) from a plurality of available RANs using an algorithm provided by the home network operator 720 during smart card initialization and/or by update transmitted wirelessly or otherwise during operation of UE 706. The selection of a RAN may be made in relation to placing a voice call while communicating on a data network and may include selecting a RAN for circuit-switched fallback.

In certain embodiments, smart storage device 802 may include a toolkit installed thereon. The toolkit may comprise a SIM toolkit and a customization toolkit configured by the home network operator 720. The toolkit may provide a plurality of applications 810, including applications 806, 832 that replace functions 820 otherwise performed by the modem 822 of UE 706 and applications that reconfigure one or more of the functions 820 performed by modem 822. The UE 706 may respond to a toolkit command to activate one or more processes enabled by the toolkit application that configure the UE 706, allowing a home network operator 720 to have full or partial control of system selection and system determination algorithms used by modem 822 of the UE 706. The toolkit command may cause software, firmware or a control algorithm to be executed by the modem 822 and/or by a processor 814 of the smart storage device 802 that reconfigures operational aspects of the modem 822. The toolkit command may replace software, firmware or a control algorithm executed by the modem 822 or other processing system provided on UE 706, including software, firmware or control algorithms that control one or more operational aspects of the modem 822.

In one example, information and applications on UICC may cause the UE 706 to be reconfigured to determine an initial system or RAT to be searched for cell acquisition purposes. In another example, information and applications on a UICC or smart storage device 802 may cause the UE 706 to be reconfigured to define behavior of UE 822 when idle, including identifying priorities for a system or RAT in which the UE 706 should camp and defining systems and RATs should be monitored for paging.

In some embodiments, the toolkit comprises a SIM application or is initiated by a SIM application. The SIM application may initiate a variety of actions related to value-added services through a set of commands, which may include a command to install and/or execute one or more toolkit processes. A toolkit process may be performed by a processor of the UICC or smart storage device 802, and reconfiguration may be accomplished by message exchange with a modem or other module of the UE 706.

In certain embodiments, home network operator 720 may update algorithms and add other algorithms and applications 810 over the air to UE 706, and thence to smart storage device 802. Accordingly, operational characteristics and functions 820 of modem 822 can be modified to accommodate changing business conditions, radio technologies and user subscriber needs and preferences.

Figure 9:
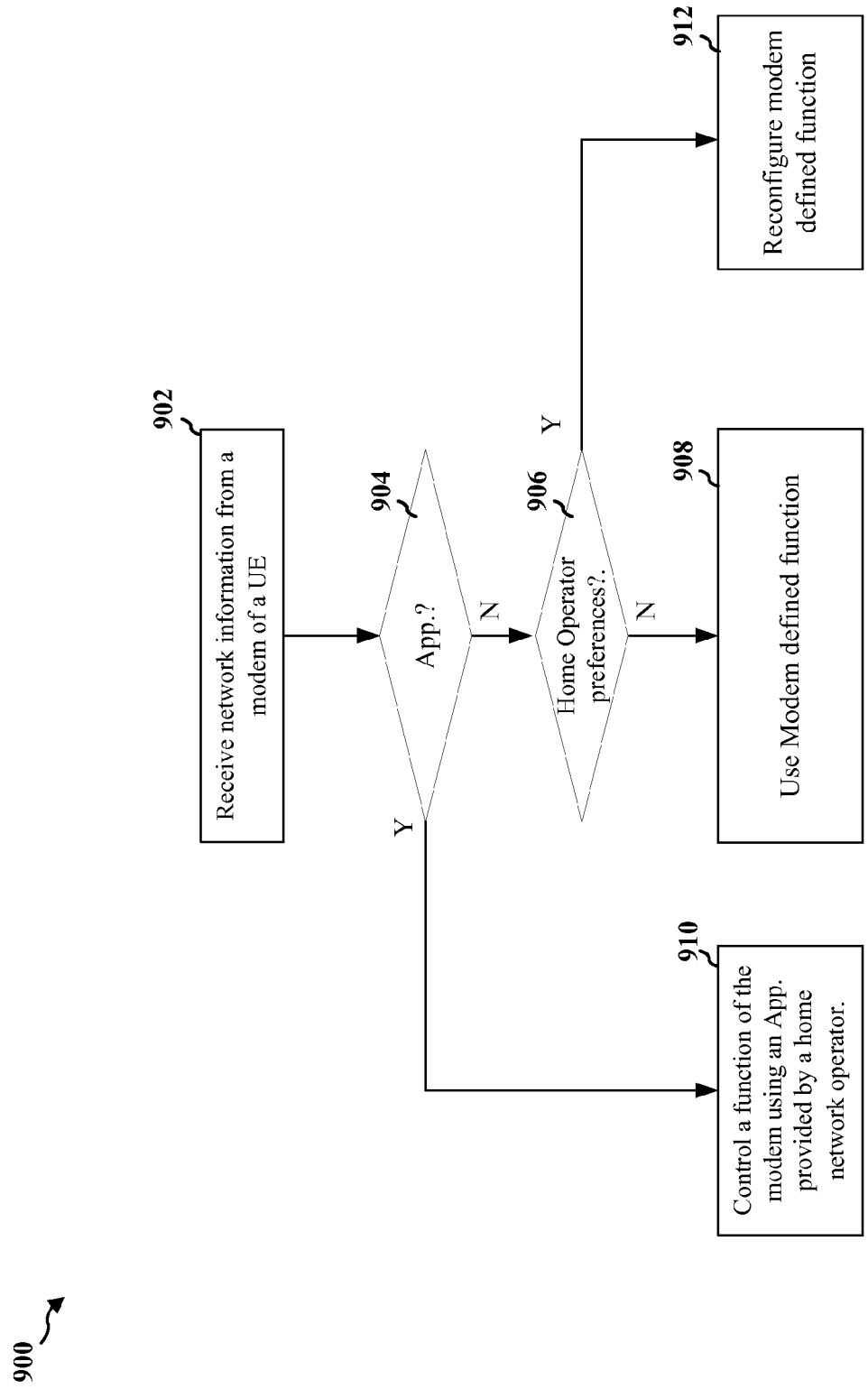
FIG. 9 is a flow chart of a method of wireless communication.

FIG. 9 is a flow chart 900 of a method of wireless communication. The method may be performed by one or more of a UE 706 and a smart storage device 802. Smart storage device 802 may comprise a UICC.

At step 902, network information is obtained, typically by or from modem 822 of UE 706. The network information may include at least one RF measurement.

At step 904 the device 802, it is determined whether a function intended to be performed by the modem 822 has been supplanted or superseded by an application executed on the smart storage device 802.

If an application is determined to be available on smart storage device 802, then at step 910, the smart storage device 802 may control and/or perform the function of the modem 822. The application may be executed using a processor 714 of smart storage device 802, which may be communicatively coupled to the UE 706. The function of the modem 822 may be controlled based on the network information and in accordance with preferences of one or more network operators 710, 720. The function of the modem 822 may be controlled by causing the modem 822 to select a RAN identified by an algorithm executed by the processor of the smart storage device 802. The algorithm may be provided or configured by a home network operator 720. The RAN is selected for circuit-switched fallback. In some embodiments, the smart storage device 802 maintains an identifier unique to the UE 706. The identifier may be used to identify the UE 706 during signal acquisition within the RAN.

In some embodiments, the function of the modem 822 may be controlled by executing a system determination algorithm on the smart storage device, and causing the modem 822 to acquire a signal of a RAN identified by the system determination algorithm. The system determination algorithm may identify the RAN based on the preferences of home network operator 720. The system determination algorithm may prevent the modem from executing another system determination algorithm.

In some embodiments, an update is received from the home network operator 720 through a wireless network. The update may include a reconfiguration of the application.

If an application is determined not to be available on smart storage device 802, then at step 906, it is determined whether home network operator 720 has provided configuration or other information for controlling the function of the modem 822.

If configuration information is determined to be available on smart storage device 802, then at step 912, the function may be performed after the modem 822 has been reconfigured. An operational aspect of the modem is configured in accordance with the preferences of home network operator 720 as expressed by the configuration information provided on the smart storage device 802. The operational aspect of the modem 822 may be configured by modifying a system determination algorithm of the modem. The operational aspect of the modem 822 may be configured by executing an application on the storage device that modifies an RF behavior of the modem.

If configuration information is determined not to be available on smart storage device 802, then at step 908, the function may be performed by the modem 822 without specific reference to the smart storage device 802.

In some embodiments the function of the modem 822 is performed during a search for a network. The function of the modem 822 may include causing the modem 822 to select a RAN from a plurality of available RANs.

Figure 10:
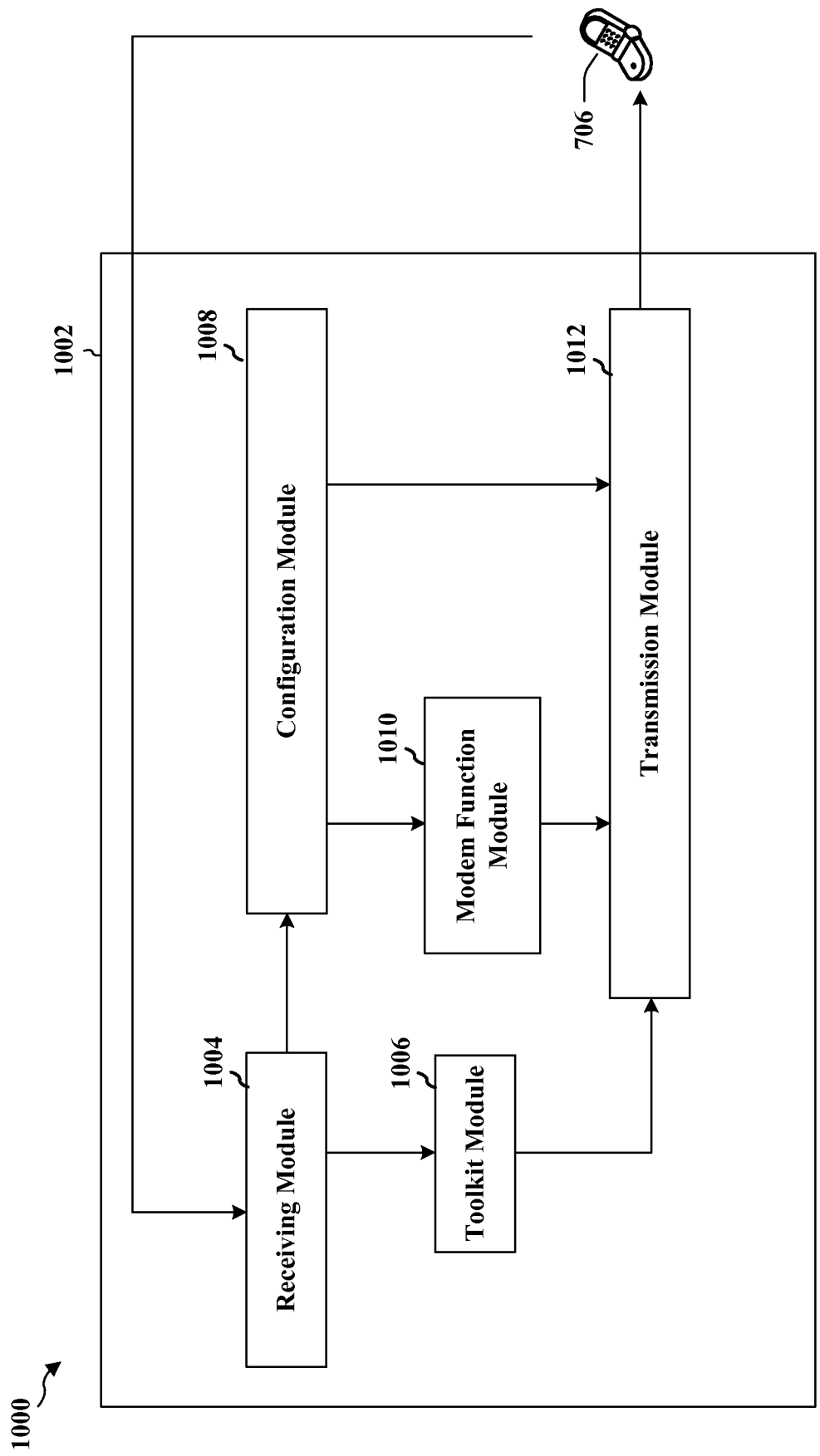
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a smart storage device 802 such as a SIM card, USIM card, UICC or other smart card. Certain modules of a UE 706 may optionally perform one or more steps, processes or functions in cooperation with smart storage device 802. The apparatus includes a receiving module 1004 that receives information and messages from UE 706, a toolkit module 1006 that initiates performance of one or more functions instead of, or on behalf of, a modem 822 of UE 706, a configuration module 1008 that reconfigures an operational aspect of the modem 822, a modem function module 1010 that performs one or more functions otherwise performed by UE 706 (such as system determination functions), and a transmission module 1012 module 1008 that transmits operational data, configuration, command and other information to UE 706.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
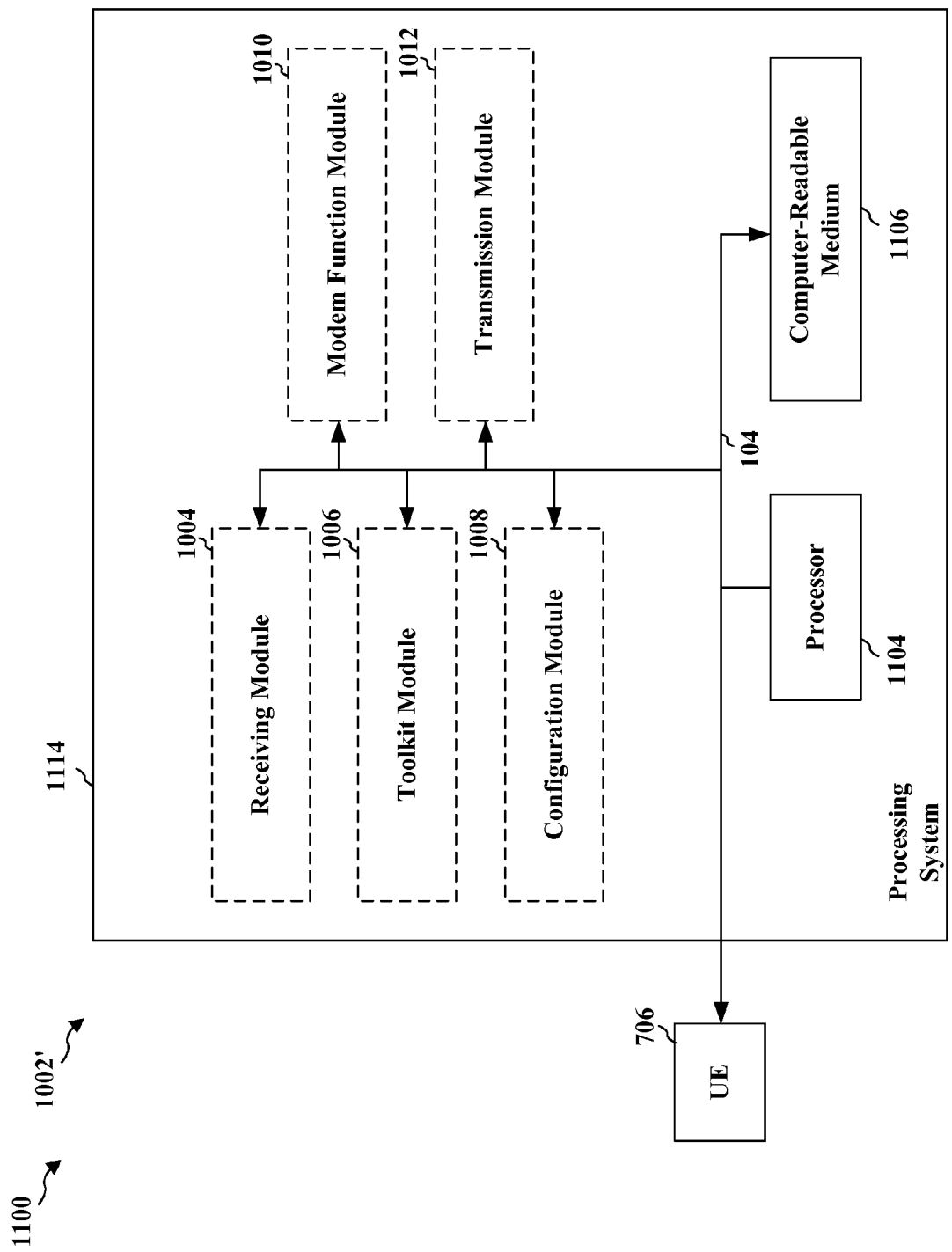
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012 and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a UE 706 through a communications device provided my transmission module 1012. The UE 706 may be configured by apparatus 1002' and one or more functions ordinarily performed by a modem 822 of UE 706 may be disabled by apparatus 1002' and the one or more functions may then be performed by modem function module 1010. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, and 1012. The modules may be software modules running in the processor 1104, resident/stored in the computer readable medium 1106, one or more hardware modules coupled to the processor 1104, or some combination thereof.

In one configuration, the apparatus 1002/1002' for wireless communication includes means 1004 for receiving network information from a modem of a UE, means 1006 for controlling a function of an RF modem using a processor of a non-volatile storage device communicatively coupled to the UE, means 1008 and 1010 for executing a system determination algorithm, and means 1012 for transmitting information to the UE 706.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving network information at a smart storage device from a modem of a user equipment (UE);

controlling a function of the modem from the smart storage device, wherein the function of the modem which includes system configuration or system selection is controlled based on the received network information and in accordance with preferences of a network operator; and using a toolkit including at least one application for replacing at least one function otherwise performed by the modem.

2. The method of claim 1, wherein the smart storage device comprises a universal integrated circuit card (UICC).

3. The method of claim 1, wherein the function of the modem is related to a search for a network.

4. The method of claim 3, wherein controlling the function of the modem includes causing the modem to select a radio access network (RAN) from a plurality of available RANs.

5. The method of claim 3, wherein controlling the function of the modem includes causing the modem to select a radio access network identified by an algorithm executed by a processor of the smart storage device.

6. The method of claim 5, wherein the algorithm provided on the smart storage device is configured by the network operator.

7. The method of claim 5, wherein the RAN is selected for circuit-switched fallback.

8. The method of claim 5, wherein the smart storage device maintains an identifier unique to the UE, wherein the identifier is used to identify the UE during signal acquisition within the RAN.

9. The method of claim 1, wherein controlling the function of the modem includes:
executing a system determination algorithm on the smart storage device; and
causing the modem to acquire a signal of a RAN identified by the system determination algorithm.

10. The method of claim 9, wherein the system determination algorithm identifies the RAN based on the preferences of the network operator.

11. The method of claim 9, wherein executing the system determination algorithm on the smart storage device includes preventing the modem from executing another system determination algorithm.

12. The method of claim 1, further comprising configuring an operational aspect of the modem in accordance with the preferences of the network operator.

13. The method of claim 12, wherein configuring the operational aspect of the modem comprises modifying a system determination algorithm of the modem.

14. The method of claim 12, wherein configuring an operational aspect of the modem includes executing an application on the smart storage device that modifies a radio frequency behavior of the modem.

15. The method of claim 14, further comprising receiving an update from the network operator through a wireless network, the update including a reconfiguration of the application.

16. An apparatus for wireless communication, comprising:
a non-transitory computer-readable medium; and
a processing system configured to:
receive network information from a modem of a user equipment (UE);
control a function of the modem, wherein the function of the modem which includes system configuration or system selection is controlled based on the received network information and in accordance with preferences of a network operator; and
use a toolkit including at least one application for replacing at least one function otherwise performed by the modem.

17. The apparatus of claim 16, wherein the processing system is configured to perform a subscriber identity function.

18. The apparatus of claim 16, wherein the function of the modem is performed during a search for a network.

19. The apparatus of claim 18, wherein the processing system controls the function of the modem by causing the modem to select a radio access network (RAN) from a plurality of available RANs.

20. The apparatus of claim 18, wherein the processing system controls the function of the modem by identifying a RAN and causing the modem to select the identified RAN.

21. The apparatus of claim 20, wherein the processing system identifies the RAN by performing an algorithm configured by the network operator.

22. The apparatus of claim 20, wherein the RAN is selected for circuit-switched fallback.

23. The apparatus of claim 20, wherein the storage stores an identifier that uniquely identifies the UE during signal acquisition within the RAN.

24. The apparatus of claim 16, wherein the processing system is configured to:
perform a system determination algorithm; and
cause the modem to connect to a RAN identified by the system determination algorithm.

25. The apparatus of claim 24, wherein the system determination algorithm identifies the RAN based on the preferences of a home network operator.

26. The apparatus of claim 24, wherein performing the system determination algorithm includes preventing the modem from performing a system determination function.

27. The apparatus of claim 16, wherein the processing system is further configured to modify an operational aspect of the modem in accordance with the preferences of the network operator.

28. The apparatus of claim 16, wherein the processing system is further configured to modify a system determination algorithm of the modem.

29. The apparatus of claim 16, wherein the processing system is further configured to execute an application on the storage device that modifies a radio frequency behavior of the modem.

30. The apparatus of claim 29, wherein the processing system is further configured to receive an update from the network operator through a wireless network, the update including a reconfiguration of the application.

31. An apparatus for wireless communication, comprising:
means for receiving network information at a smart storage device from a modem of a user equipment (UE);
means for controlling a function of the modem from the smart storage device, wherein the function of the modem which includes system configuration or system selection is controlled based on the received network information and in accordance with preferences of a network operator; and
means for using a toolkit including at least one application for replacing at least one function otherwise performed by the modem.

32. The apparatus of claim 31, wherein the smart storage device comprises a universal integrated circuit card (UICC).

33. The apparatus of claim 31, wherein the function of the modem is performed during a search for a network.

34. The apparatus of claim 33, wherein controlling the function of the modem includes causing the modem to select a radio access network (RAN) from a plurality of available RANs.

35. The apparatus of claim 33, wherein controlling the function of the modem includes causing the modem to select a radio access network identified by an algorithm executed by a processor of the smart storage device.

36. The apparatus of claim 35, wherein the algorithm provided on the smart storage device is configured by the network operator.

37. The apparatus of claim 35, wherein the RAN is selected for circuit-switched fallback.

38. The apparatus of claim 35, wherein the smart storage device maintains an identifier unique to the UE, wherein the identifier is used to identify the UE during signal acquisition within the RAN.

39. The apparatus of claim 31, wherein controlling the function of the modem includes:
   executing a system determination algorithm on the smart storage device; and
   causing the modem to acquire a signal of a RAN identified by the system determination algorithm.

40. The apparatus of claim 39, wherein the system determination algorithm identifies the RAN based on the preferences of the network operator.

41. The apparatus of claim 39, wherein executing the system determination algorithm on the smart storage device includes preventing the modem from executing another system determination algorithm.

42. The apparatus of claim 31, further comprising configuring an operational aspect of the modem in accordance with the preferences of the network operator.

43. The apparatus of claim 42, wherein configuring the operational aspect of the modem comprises modifying a system determination algorithm of the modem.

44. The apparatus of claim 42, wherein configuring an operational aspect of the modem includes executing an application on the smart storage device that modifies a radio frequency behavior of the modem.

45. The apparatus of claim 44, further comprising receiving an update from the network operator through a wireless network, the update including a reconfiguration of the application.

46. A smart storage device, comprising a processor and a non-transitory computer-readable medium comprising code for causing the processor to:
   receive network information from a modem of a user equipment (UE) communicatively coupled to the smart storage device;
   control a function of the modem based on the received network information and in accordance with preferences of a network operator, wherein the function of the modem includes system configuration or system selection; and
   use a toolkit including at least one application for replacing at least one function otherwise performed by the modem.

47. The smart storage device of claim 46, wherein the function of the modem is performed during a search for a network.

48. The smart storage device of claim 47, wherein the function of the modem is controlled by causing the modem to select a radio access network (RAN) from a plurality of available RANs.

49. The smart storage device of claim 47, wherein the function of the modem is controlled by causing the modem to select a radio access network identified by an algorithm executed by a processor of the smart storage device.

50. The smart storage device of claim 49, wherein the algorithm provided on the smart storage device is configured by the network operator.

51. The smart storage device of claim 49, wherein the RAN is selected for circuit-switched fallback.

52. The smart storage device of claim 49, wherein the non-transitory computer-readable medium maintains an identifier used to uniquely identify the UE during signal acquisition within the RAN.

53. The smart storage device of claim 46, wherein controlling the function of the modem includes:
   executing a system determination algorithm on the smart storage device; and
   causing the modem to acquire a signal of a RAN identified by the system determination algorithm.

54. The smart storage device of claim 53, wherein the system determination algorithm identifies the RAN based on the preferences of the network operator.

55. The smart storage device of claim 53, wherein executing the system determination algorithm on the smart storage device includes preventing the modem from executing another system determination algorithm.

56. The smart storage device of claim 55, further comprising configuring an operational aspect of the modem in accordance with the preferences of the network operator.

57. The smart storage device of claim 56, wherein configuring the operational aspect of the modem comprises modifying a system determination algorithm of the modem.

58. The smart storage device of claim 56, wherein configuring an operational aspect of the modem includes executing an application on the smart storage device that modifies a radio frequency behavior of the modem.

59. The smart storage device of claim 58, further comprising receiving an update from the network operator through a wireless network, the update including a reconfiguration of the application.

* * * * *